A. N. WALQUIST.
TAILOR'S MEASURE.
APPLICATION FILED FEB. 28, 1911.
1,014,542.
Patented Jan. 9, 1912.
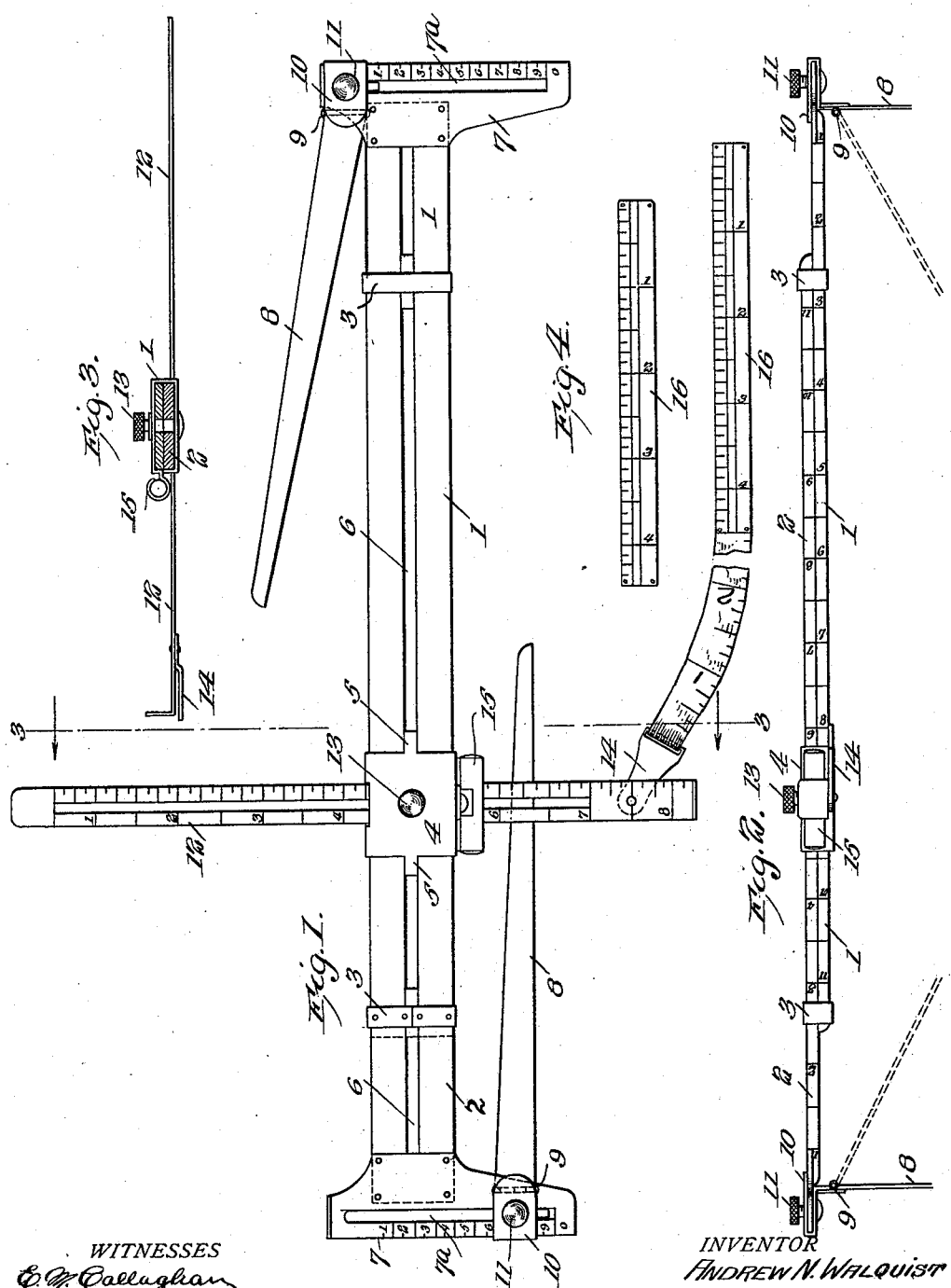
WITNESSES
E. M. Callaghan
Amos W. Hart
INVENTOR
Andrew N. Walquist
BY Munn & Co.
Attorneys

UNITED STATES PATENT OFFICE.

ANDREW N. WALQUIST, OF SEATTLE, WASHINGTON.

TAILOR'S MEASURE.

1,014,542.  Specification of Letters Patent.  Patented Jan. 9, 1912.

Application filed February 28, 1911. Serial No. 611,349.

*To all whom it may concern:*

Be it known that I, ANDREW N. WALQUIST, a citizen of the United States, and a resident of Seattle, in the county of King and State of Washington, have invented certain Improvements in Tailors' Measures, of which the following is a specification.

My improved measure is designed and adapted for quickly and accurately determining the height and level of shoulders as well as the pitch of the head and neck, to be used in drafting patterns and cutting garments, more particularly coats.

The details of construction, arrangement, and combination of parts are as hereinafter described and claimed, reference being had to the accompanying drawing, in which—

Figure 1 is a plan view of the complete instrument. Fig. 2 is an edge or top view. Fig. 3 is a section on the line 3—3 of Fig. 1. Fig. 4 is a plan view of an attitude scale to be used with the free end of the tape line.

The body of the instrument is composed of two rules, indicated by numerals 1 and 2 in Figs. 1 and 2, the same being laid flat together and adapted to slide on each other. Both are graduated in inches, and in proportions they are preferably made eleven and one-half inches long, one inch wide, and one-eighth inch thick. The inner end of each rule is attached to a metal band or clasp 3 which slides on the other rule, and the rules are connected centrally by a larger clasp or band 4. Each of the clasps 3, 4, has a prong 5 which enters a longitudinal slot 6 formed in each of the rules. Thus, the two rules are permanently connected with each other and adapted to slide so that they may be extended to the full length of twenty-one inches, but, when closed, the length is but twelve and one-half inches.

To the outer end of each rule 1, 2, is applied a metal head 7, which is, say, three inches in length, and arranged in the same plane with the rules. Each head is provided with a lengthwise slot 7ª which runs at right angles to the slot 6 of the rules 1, 2, and graduations 1—0 are applied along the edge of the slot. To each of the heads 7 there is attached a shoulder arm 8 which is hinged at 9 to a clasp 10 that is attached to the head and provided with a clamp-screw 11 for securing it in any required adjustment thereon. The screw passes through the clasp and the slot 7ª and serves to clamp the clasp 10 in any vertical adjustment on the head 7.

A perpendicular sliding scale 12, consisting of a thin metal bar graduated in inches and provided with a lengthwise slot, is adapted to slide through the central clasp 4 and may be secured thereto in any required adjustment by means of a clamp-screw 13. To the lower end of this scale bar is pivoted a plate 14, to which, in practice, a graduated tape line 24 inches in length is attached. To the clasp 4 and arranged directly beneath the same is secured a liquid level 15—see Figs. 1 and 3.

The operation of my improved measuring instrument may now be fully understood. The body composed of the sliding rules 1, 2, is laid against the back of the person to be measured, with the top of the rules on a level with his shoulders and the hinged arms 8 extending forward and resting on the top of the shoulders. Then by observing the level 15 and thus holding the rules 1, 2 in a perfectly horizontal position, the said arms 8 are adjusted up or down as may be required according to the slope or difference of slope of the shoulders. The central vertical scale 12 is adjusted higher or lower as required to indicate and determine the vertical distance between the top of the shoulders and the second vertebra, or the place where the collar-button is ordinarily located. The point of the shoulders which is to be observed in making this measurement is one-half inch inside of the edge of the shoulder where the arm joins it. Then in order to obtain the pitch or forward inclination of the neck of the individual, the rule 16 attached to the tape is placed against the upper portion of the sliding vertical rule or scale 12 and is held in horizontal position, projecting forward, or what is the same thing at a right angle to the scale 12. It is obvious that the distance between the individual's neck and the top of the scale 12 will be according to the forward pitch of the neck. This rule is sewed to the free end of the tape in order that it may be always convenient for use.

The tape is used for obtaining the front arm measure from the collar-button to depth of scye in front, also sleeve length in front. In taking this measure, the bars or rules 1, 2 are shoved together and placed close up under one arm, the bar 12 and the level 15 being held in front of the arm so as to get a perfect arm scye level. When the instrument is held in this position, the tape may be run over the shoulder to the center of the back to obtain what is called the over-shoulder measure. It may also be run underneath the arm to the center of the back to obtain what is called the blade-measure.

By use of this instrument a perfect and graceful fit of a coat or similar garment on the shoulders may be obtained, whether the shoulders be high or sloping or one lower than the other, also whether the head be carried forward or erect. In brief, it will enable the garment to be perfectly "balanced."

What I claim is:—

1. The improved tailor's measuring instrument, comprising a body portion formed of two graduated rules adapted to slide lengthwise on each other, clasps for holding the rules in due engagement, vertically slotted heads applied one to the end of each sliding rule, a device which is adapted for adjustment on the heads, a shoulder arm hinged to such device, and a vertically slidable scale consisting of a rigid graduated bar arranged at right angles to the sliding rules and adapted for adjustment lengthwise, and means for securing said scale in any desired adjustment, substantially as described.

2. The improved tailor's measuring instrument, comprising two graduated rules adapted to slide lengthwise on each other and each provided at its outer end with a vertically slotted head, clasps for holding the rules in slidable engagement, devices which are slidable on said heads, shoulder arms hinged to said devices and means for clamping the devices in any adjustment, a vertically slidable graduated bar arranged at right angles to the rules and adjustable vertically with relation thereto, means for securing the scale to said rules and clamping it in any adjustment, and a means for determining level of the rules, the same being attached to the body of the instrument, substantially as described.

3. In a tailor's measure, the combination with a rigid body portion and devices that are slidable transversely of its ends, of shoulder arms having a hinge connection with said devices which adapts them to be extended so as to project laterally from the body and to be adjusted with the devices higher or lower on the body portion when in such position, as shown and described.

4. The combination of a body portion comprising two graduated rules laid together and adapted to slide upon each other, clasps for holding them in due engagement, a vertically extended and graduated head secured to the end of each rule, a shoulder arm, and a clasp to which it is hinged so as to swing outwardly, the said clasp being adjustable vertically on the graduated heads and means for clamping it in any required adjustment thereon, as shown and described.

ANDREW N. WALQUIST.

Witnesses:
  LLOYD T. DALEY,
  A. H. BENSON.